(No Model.)
A. BRAUER.
POWER MECHANISM FOR BICYCLES.
No. 571,469. Patented Nov. 17, 1896.
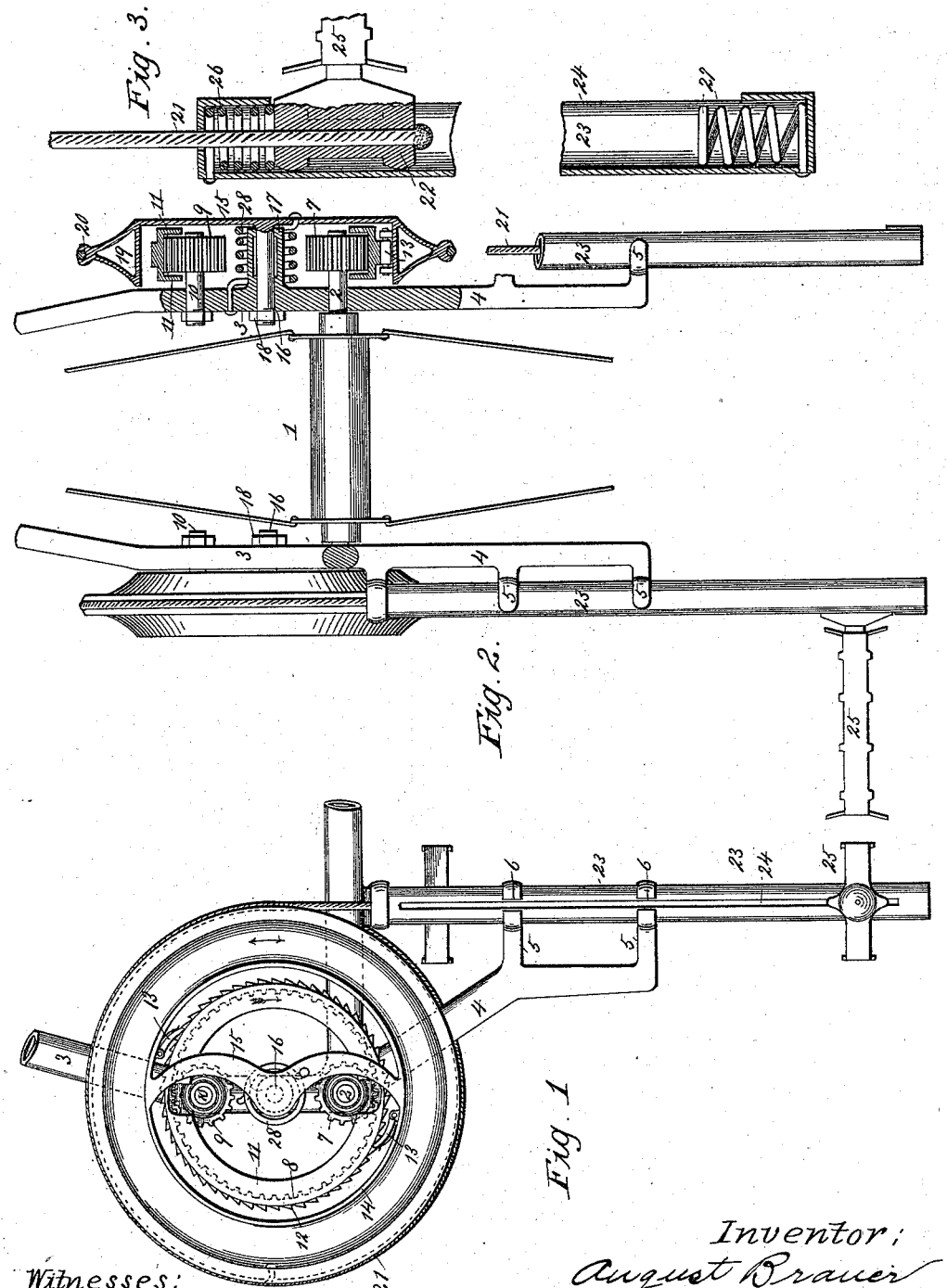
Witnesses:
F. G. Fischer
C. W. Thorpe
Inventor:
August Brauer
By Higdon & Higdon
Attys.

UNITED STATES PATENT OFFICE.

AUGUST BRAUER, OF INDEPENDENCE, MISSOURI.

POWER MECHANISM FOR BICYCLES.

SPECIFICATION forming part of Letters Patent No. 571,469, dated November 17, 1896.

Application filed June 29, 1896. Serial No. 597,456. (No model.)

*To all whom it may concern:*

Be it known that I, AUGUST BRAUER, of Independence, Jackson county, Missouri, have invented certain new and useful Improvements in Power Mechanism for Bicycles, of which the following is a full, clear, and exact description, reference being had to the accompanying drawings, forming a part thereof.

My invention relates to power mechanism for bicycles, tricycles, and analogous machines; and my object is to produce a mechanism of this character which is positive and reliable, and which combines simplicity, strength, durability, and inexpensiveness of manufacture in a high degree.

To these ends the invention consists in certain novel and peculiar features of construction and combination of parts, as will hereinafter be described and claimed.

In order that the invention may be fully understood, I will proceed to describe it with reference to the accompanying drawings, in which—

Figure 1 represents, in side elevation, a manual power mechanism embodying my invention. Fig. 2 represents a cross-section of the same. Fig. 3 represents, on an enlarged scale, a part of such mechanism.

In such drawings, 1 designates the drive-wheel of a bicycle or other vehicle. Said wheel, owing to its large scale, is shown broken away, and it is mounted rigidly upon the axle or shaft 2. Said axle or shaft is journaled in a framework 3, which may be of any suitable or preferred form of configuration, and said framework below said axle or shaft is extended downwardly, as shown at 4 4, and is provided with two or more guide arms or sleeves 5, and said guide arms or sleeves are provided at their outer side and in vertical alinement with the slots or passages 6. Mounted rigidly on the ends of the axle or shaft 2 are cog-pinions 7, which engage at all times the internal or cog teeth of the rings 8, which rings are disposed eccentrically of the axis of the axle or shaft 2. Said rings are arranged with their axes vertically over the center of the axle or shaft 2, and are maintained continuously in such relative position by the engaging cog-pinions 9, mounted loosely upon the outwardly-projecting stub-shafts 10 of the framework. To prevent any possible lateral displacement or movement of said rings upon said cog-pinions 7 and 9, they are provided with the inwardly-projecting annular flanges 11, embracing the opposite sides or faces of said pinions. The rings 8 peripherally are provided each with a circular series of ratchet-teeth 12, and engaging said ratchet-teeth at diametrically opposite points are the spring-actuated pawls 13, pivoted internally of the annuli or rings 14, which surround said rings 8. Said annuli are provided with cross-arms 15, from which project inwardly the stub-shafts 16, journaled in the cylindrical bearing sleeves or extension 17, projecting outwardly from the framework 3, and said annuli are held reliably in such position by means of a retaining-nut 18. Said annuli are also provided with outwardly-converging or V-shaped flanges 19, having annular grooves 20 at their apices, in which at a suitable point the cables 21 are securely or rigidly fastened. The opposite ends of said cables extend pendently down and are secured reliably to the sliding blocks 22, fastened snugly within the cylindrical guide-tubes 23, securely fastened to and within the guide arms or sleeves 5, and provided with longitudinal slots 24, which register with the openings or passages 6 of said guide-sleeves. Said sliding blocks 22 extend through said slots to prevent any rotatable movement and carry pedals 25 of the form shown or any other suitable or preferred construction. Located in the upper and lower ends of said guide-tubes 23 are cushions in the shape of spiral springs 26 and 27, respectively, these springs being designed to offer a yielding resistance to the upward or downward movement of the pedals as they reach the limits of such strokes, respectively, and are also designed to react and thereby assist the rider by their expansive action in the propulsion of the vehicle.

From the above description it is obvious that as the rider forces one pedal down the other is arranged to move upward, so that the alternate depression of said pedals causes a continuous rotation of the drive-wheel. As each pedal starts on its downward course the flexible cable 21 causes as it is paid out the rotation of its corresponding annulus 14, and said annulus through the medium of the spring-actuated pawls causes a corresponding rotation of the toothed ring 8, and the latter through the medium of its engaging pinion 7 acts upon the shaft of the drive-wheel and consequently rotates the latter. Upon the upward movement of the pedal the cable is rewound upon said annulus, owing to the fact that the latter is oscillated backward by means of the stiff spring 28 surrounding the bearing 17 of the framework and secured at its opposite ends to said framework and to the cross-bar of the annulus. It will be observed in this connection that the relation between each cable and annulus is such that the greatest leverage to be obtained is always in service, that is, the leverage is the same at all points in the stroke of the pedal. It is obvious therefore that the rider is applying full power from the beginning to the end of the stroke of the pedals, which is a decided advantage over the rotary pedal stroke now in such use, owing to the fact that with such rotary pedals power is actually applied upon them for only a little more than one-third of their movement.

Thus it will be seen that I have produced a power mechanism for bicycles which is positive and reliable in operation and by which great and continuous leverage is obtained from the beginning to the end of each stroke, in order that the greatest possible speed may be obtained with the minimum amount of power expended.

Having thus described the invention, what I desire to secure by Letters Patent is—

1. A power mechanism for vehicles comprising a suitable framework, a shaft journaled therein a wheel upon said shaft, cog-pinions upon said shaft, internally-toothed rings engaging said pinions and arranged eccentrically thereon, and provided externally with ratchet-teeth, grooved annuli surrounding said rings concentrically and suitably journaled, spring-actuated pawls carried thereby and engaging said ratchet-teeth, vertical slotted guide-tubes carried by the framework, sliding blocks therein and projecting through said slots, pedals carried by said blocks, cables engaging and secured to said grooved annuli and to said sliding blocks, and cushions or springs in the upper and lower ends of said guide-tubes, substantially as described.

2. A power mechanism for vehicles comprising a framework, a shaft journaled therein, a wheel mounted upon said shaft, cog-pinions upon said shaft, idle cog-pinions carried by stub-shafts of the framework, rings eccentrically surrounding the first-named cog-pinions and provided with cog-teeth engaging said cog-pinions and the idle cog-pinions and with flanges at the inner and outer sides or faces of the same, and provided also with peripheral ratchet-teeth, annuli surrounding said rings, and provided with central stub-shafts journaled in the framework, springs secured at their opposite ends to said framework and to said annuli, spring-actuated pawls engaging said ratchet-teeth and carried by said annuli, flexible connections mounted in peripheral grooves of said annuli and vertically-reciprocating pedals attached to said cables, substantially as described.

In testimony whereof I affix my signature in presence of two witnesses.

AUGUST BRAUER.

Witnesses:
L. GORMAN,
G. Y. THORPE.